(12) United States Patent
Axlinder

(10) Patent No.: US 9,380,901 B2
(45) Date of Patent: Jul. 5, 2016

(54) CLOTHING RACK DEVICE

(71) Applicant: Moette i Garderoben AB, Täby (SE)

(72) Inventor: Tommy Axlinder, Täby (SE)

(73) Assignee: Moette i Garderoben AB, Täby (SE)

( * ) Notice: Subject to any disclaimer, the term of this patent is extended or adjusted under 35 U.S.C. 154(b) by 0 days.

(21) Appl. No.: 14/522,699

(22) Filed: Oct. 24, 2014

(65) Prior Publication Data

US 2015/0041504 A1 Feb. 12, 2015

Related U.S. Application Data

(63) Continuation of application No. PCT/SE2013/050456, filed on Apr. 25, 2013.

(30) Foreign Application Priority Data

Apr. 27, 2012 (SE) .................................. 1250427-0

(51) Int. Cl.
*A47G 25/14* (2006.01)
*A47G 25/32* (2006.01)
*F16B 1/00* (2006.01)

(52) U.S. Cl.
CPC ................ *A47G 25/14* (2013.01); *A47G 25/32* (2013.01); *F16B 1/00* (2013.01); *A47G 2200/106* (2013.01); *F16B 2001/0035* (2013.01)

(58) Field of Classification Search
CPC . A47G 25/14; A47G 25/32; A47G 2200/106; F16B 1/00; F16B 2001/0035
See application file for complete search history.

(56) References Cited

U.S. PATENT DOCUMENTS

| | | | |
|---|---|---|---|
| 2008/0120865 A1* | 5/2008 | Smith ................... | F26B 25/003 34/239 |
| 2009/0008519 A1* | 1/2009 | Wang ..................... | F16B 45/00 248/206.5 |
| 2009/0139945 A1 | 6/2009 | Jacobson | |
| 2010/0252587 A1 | 10/2010 | Boles | |

FOREIGN PATENT DOCUMENTS

| | | |
|---|---|---|
| CN | 201577991 | 9/2010 |
| KR | 20120001557 | 1/2012 |

* cited by examiner

*Primary Examiner* — Shaun R Hurley
*Assistant Examiner* — Andrew W Sutton
(74) *Attorney, Agent, or Firm* — Gabriela B. Tomescu, Esq.; Bergenstrahle & Partners AB

(57) ABSTRACT

Clothing rack device (1) for suspension of clothes, in which a magnet (2) is arranged in a section of the clothing rack device (1) adapted to attach the clothing rack device (1) with a bonding surface (4) to a separate surface (5), where in the clothing rack device (1) further comprises a release device (7) adapted to be moved between a first and second state, in which the magnetic force between the magnet (2) and a separate surface (5) abutting the bonding surface (4) is greater in the first state than in the second.

20 Claims, 2 Drawing Sheets

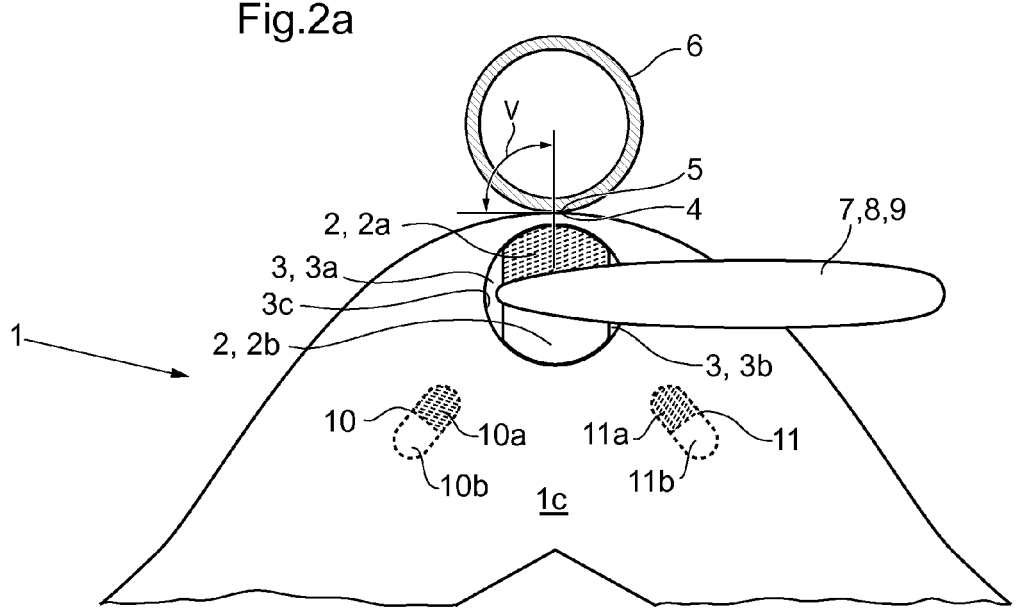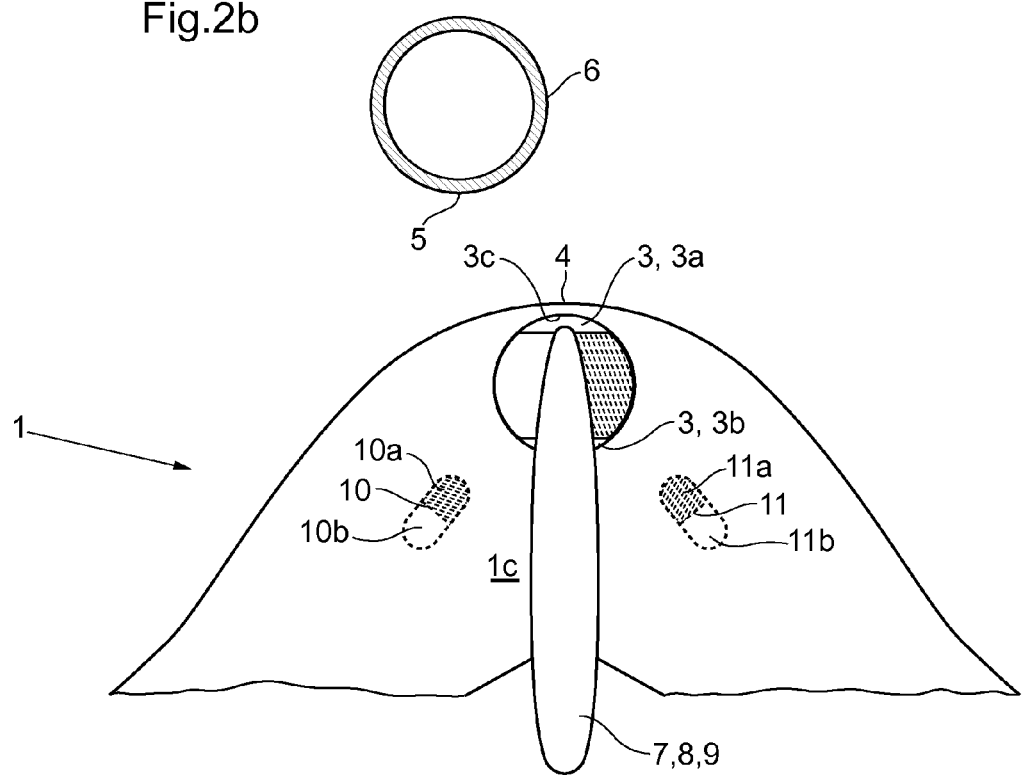

CLOTHING RACK DEVICE

This application is a continuation of PCT Application No. PCT/SE2013/050456, filed Apr. 25, 2013, and claims priority of SE 1250427-0, filed Apr. 27, 2012, the entire contents of each of which are hereby incorporated by reference.

Background

The present invention relates generally to a clothing rack device, which is intended to hang clothes on.

In prior art it is known to use a clothing rack or hanger which instead of the normal existing hook to hang the clothing rack around for example a rod arranged in a clothing closet uses a permanent magnet. The permanent magnet is arranged in the hanger's central section and can be attached to already existing clothing rods or other metal or magnetic flat surfaces. Some examples of such cloth racks are shown in the documents US2010252587 and CN201577991U. The benefit with utilizing magnets and attaching against those types of surfaces are for example to achieve space savings through release of space underneath the clothes in for example a closet space through that space created through a hook extending in a vertical direction for hanging is minimized. Another purpose is to avoid non-beneficial ergonomic motion paths for the body during hanging and removal of clothing racks with heavy clothing.

A problem with those magnetic clothing racks is that the force of the permanent magnet has to be significant enough to suspend heavy coats without the clothing rack disengages from the separate bonding surface and falls down.

The large force has made it ungainly to use those clothing racks then at the same time a large force has been required when the clothing rack shall be removed from the separate bonding surface, especially in a cramped surrounding in which the clothing racks normally are hanged on at a non-ergonomic height for hanging and removal.

Summary

An object of the present invention is to decrease the force for removal of a clothing rack of magnetic type while simultaneously heavy clothing can be hanged on the clothing rack without it falling down.

Another object of the invention is to achieve space savings in a compartment in which clothing are intended to be hanged.

At least some of the above mentioned objectives are achieved through the following:

According to one embodiment a clothing rack device for suspension of clothes is shown, in which a magnet is arranged in a section of the clothing rack device to attach the clothing rack device with a bonding surface to a separate surface, in which the clothing rack device further comprises a release device adapted to be moved between a first and second state, in which the magnetic force between the magnet and a separate surface abutting the bonding surface is greater in the first state than in the second.

According to another embodiment a clothing rack device for suspension of clothes is shown, in which a magnet is arranged in a section of the clothing rack device, in which the clothing rack device further comprises a release device adapted to be moved between a first and second state, in which the magnetic flux density through the bonding surface is greater in the first state than in the second.

According to another embodiment a clothing rack device is shown, in which the magnet is pivotally arranged in a space in the clothing rack device in which the magnet is adapted to be pivoted between a first and second state, in which the magnet in the first state is arranged in a south-north end direction which is perpendicular to the bonding surface, in which the magnet in the second state is arranged in a south-north end direction which has an angel v≠90° towards the bonding surface, in which the south-north end direction preferably is parallel to the bonding surface.

According to another embodiment a clothing rack device is shown, in which the magnet is adjacent to the internal wall of the space in a direction towards the bonding area in the first state, in which an air gap exists between the magnet and the internal wall of the space in the direction towards the bonding area in the second state.

According to another embodiment a clothing rack device is shown, in which the bonding surface comprises a magnetic material.

According to another embodiment a clothing rack device is shown, in which the magnet is adapted to be biased towards the first state.

According to another embodiment a clothing rack device is shown, in which support magnets are arranged in the clothing rack device, which each have their respective south-north end direction facing substantially towards a center or a rotation point of the magnet.

According to another embodiment a clothing rack device is shown, in which the magnet is adapted to be biased towards the first state by means of a spring.

According to another embodiment a clothing rack device is shown, in which the release device comprises an activation arm arranged in the magnet, in which the activation arm extends from the surface of the clothing rack device.

According to another embodiment a clothing rack device is shown, in which the magnet is a neodymium magnet.

According to another embodiment a clothing rack device is shown, in which the magnet is arranged centrally in the clothing rack device.

Note that the invention can be combined freely within the scope of the patent claims.

BRIEF DESCRIPTION OF DRAWINGS

The invention is now described, by way of example, with reference to the accompanying drawings, in which:

FIG. 2a shows a section of a clothing rack device according to FIG. 1 in which the clothing rack device is attached to a separate surface.

FIG. 2b shows a section of a clothing rack device according to FIG. 1 in which the clothing rack device is released from the separate bonding surface.

DETAILED DESCRIPTION OF PREFERRED EMBODIMENTS

Figure 1:
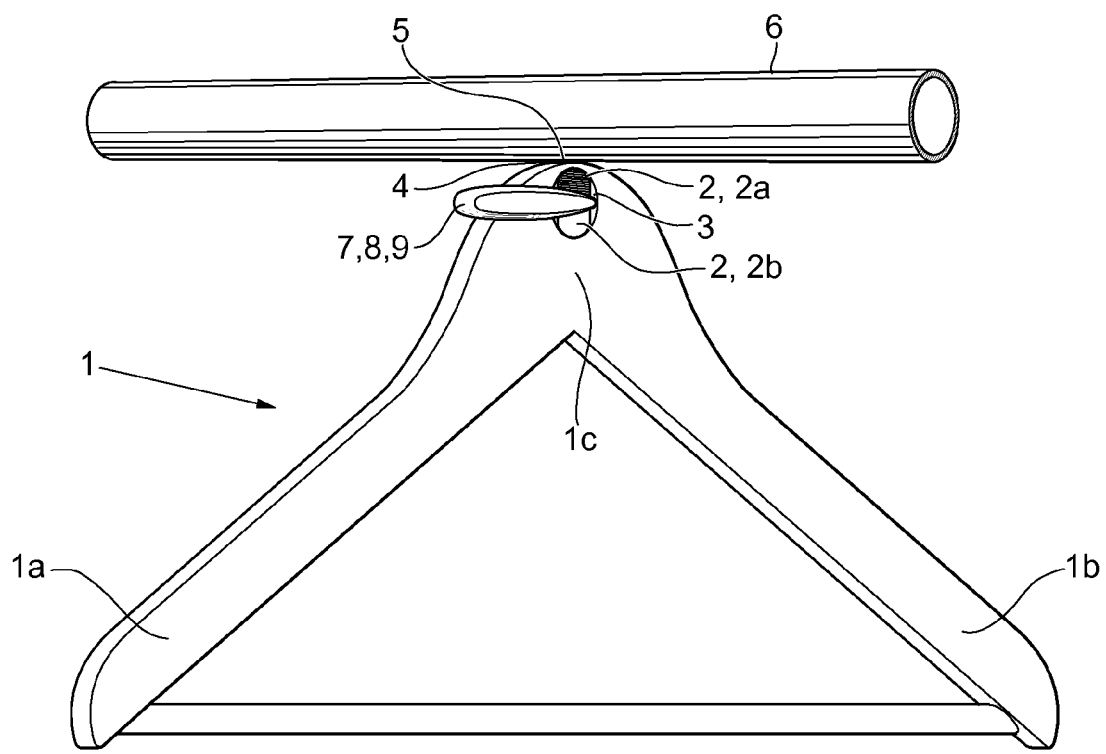
FIG. 1 shows a side view of a clothing rack device.

In the following, a detailed description of the embodiments is made under reference to the accompanying drawings. It shall be noted that the figures only are intended as illustrations of embodiments and shall not be considered limiting to the claim scope. Indications of directions shall be seen as indications of directions in the drawings.

FIG. 1 shows a side view of a clothing rack device 1 in which a magnet 2 is arranged in the clothing rack devices central section 1c centrally between two extending arms 1a, 1b. The clothing rack device can for example consist of wood, composite, plastic or for example metal. The magnet 2 is arranged in a space 3, in which the space 3 is arranged close to a surface section 4 such as a bonding surface 4 of the clothing rack device 1 which is adapted to be adjacent or abut against a separate surface 5 against which the clothing rack device 1 intends to be attached. In one embodiment the bonding surface 4 is constituted of a surface section which is adjacent/abuts a separate surface 5 when the clothing rack device 1 is attached against the separate surface 5. In one embodiment when the clothing rack device 1 substantially is designed as a regular hanger but lacks the normally occurring hook, the bonding surface location is substantially corresponding to the point in which the hook normally is attached to the hanger, i.e. centrally in the clothing rack device/hanger on an upper surface of the clothing rack device 1. In one embodiment the bonding surface 4 is constituted of a part of the magnet 2, for example in the case when the magnet 2 is for example an electro magnet. In another embodiment the bonding surface 4 is constituted of a magnetic material such as iron or steal. In one embodiment when the bonding surface 4 is constituted of a magnetic material can this material for example consist of a pin arranged in a space to the largest part arranged within the clothing rack device 1. In another embodiment when the bonding surface 4 consist of a magnetic material can this material be adapted to substantially be arranged to be extending from the remaining parts of the clothing rack device 1. The magnetic material in this case preferably has at least one flat abutment surface adapted to abut against the separate surface 5. In this connection can also the magnetic material have a substantially vaulted arc section in a direction towards the other parts of the clothing rack device 1 in which only a smaller section of the magnetic material is adjacent and connects a surface of the other parts of the clothing rack device 1 which don't consist of the magnetic material. The purpose with the bonding surface comprising a magnetic material is that this strengthens the magnetic field against the material above, i.e. creates an increased magnetic force towards the separate bonding surface 5. The purpose with a vaulted surface of the magnetic material is to create an enlarged air gap between the other parts of the clothing rack device 1 and thereby the magnet 2 which decreases the magnetization quicker when the magnet is in a certain state, corresponding to the second state which will be described further down. In the case where the bonding surface 4 is separate from the magnet 2 and don't consist of a magnetic material should the smallest distance from the verge of the space 3 to the bonding surface 4 preferably be in the interval 0.3 mm-4.0 mm, more preferably in the interval 0.3-1.0 mm, to obtain an adequately large magnetic force in a direction perpendicular towards the bonding surface 4 simultaneously as the clothing rack device 1 in the bonding surface 4 has an adequately large strength. Another way to express this is that the magnetic flux density B and thereby the field of magnetization M through the bonding surface 4 in the case where the separate surface 5 don't comprises a permanent magnet shall be adequately large. According to one embodiment this can be expressed as that the magnetic flow through a given surface and area corresponding to the bonding surface 4 shall be adequately large. A separate surface 5 comprises for example a section of existing clothing rods 6 in a closet, such as a cylinder surface, or a flat surface belonging to for example the sealing or lower part of a shelf in a closet. This separate surface 5 shall be of a magnetic material such as a ferro-magnetic material or other material on which magnets can adhere with the help of a magnetic force through magnetization of the material with the help of the magnet 2. In one embodiment said separate surface comprises a permanent magnet. The magnet 2 is preferably a permanent magnet comprising a north-end 2a, which is shown through a dashed section of the magnet 2 and a south-end 2b, which is shown through a white/non-dashed section of the magnet 2, but can also consist of an electro magnet in another embodiment. In one embodiment a release device 7 is arranged to the magnet 2 in the form of an extending section 8 which admit displacement of the magnet 2. In another embodiment the release device 7 consists of a button for off or on activation of an electromagnet. In yet another embodiment the release device can consist of a material which shields a magnetic field from the magnet 2. The release device is adapted to be brought between at least a first and a second state. In one embodiment the magnet 2 is brought from a first state to a second state when the release device 7 is brought from the first to the second state and reverse; when the release device 7 is brought from the second state to the first state the magnet is brought from the second to the first state. In another embodiment the state of the magnet 2 is not affected when the release device is brought between its first and second state. The extending section 8 can in a further embodiment be designed as a handle 9, or activation leaver, which is shown in FIG. 1-2. In one embodiment the release device can consist of a part of the magnet 2 itself, for example a surface section of the magnet 2. The magnet 2 has in one embodiment a power of 5-10 kg of lifting force to be able to adequately carry heavy garment such as for example coats.

FIG. 2a shows a clothing rack device 1 according to one embodiment in which the magnet 2 is arranged in a space 3 of the clothing rack device 1 and in which the magnet 2 further is adapted to be brought between at least a first state and a second state through bringing the release device 7 between a corresponding first and second state. According to one embodiment the space is substantially cylindrical. According to one embodiment the magnet 2 is pivotally arranged in the space 3, adapted to pivot between the first and the second state through influence of the release device between the corresponding first and second state. In such one embodiment the magnet 2 can be designed as a cylinder, or part of a cylinder in which at least one air gap 3a is formed between the magnet and the limiting/verge/internal wall 3c of the space 3 which limits the space 3, in which said at least one air gap 3a overlaps both a section of the north-end and a section of the south-end of at least one side of the magnet 2 in one embodiment, the magnet 2 is further adapted to along sections corresponding to the envelope surface of the cylinder form of the magnet 2 adjoining fit in the substantially cylindrical space 3 through abutting at least the internal wall 3c. As shown in FIG. 2a the magnet 2 can also be designed such that two air gaps 3a, 3b are formed on each side of the magnet 2. According to another embodiment the magnet two is linear displaceable within the space 3, adapted to linear be displaced between the first and the second state. The release device 7, but also the magnet 2 is in FIG. 2a in a first state, in which the attachment of the clothing rack device with a bonding surface 4 against the separate surface 5 is possible. The attachment between the bonding surface 4 and the separate surface 5 in the first state is enabled through that the magnetic force between the magnet 2 and in some cases when the bonding surface 4 consist of a magnetic material between the bonding surface 4 and a separate surface 5 brought in the vicinity of the bonding surface 4 is adequately large to carry the clothing rack device 1 and potential clothing garments arranged on the clothing rack device 1. In the first state the magnetic flux density or field of magnetization or magnetic flow through the bonding surface 4 is larger than in the second state. In one embodiment shall this be fulfilled at least when the separate surface 5 abuts the bonding surface 4. In one embodiment, which is sown in FIG. 2a, the magnet 2 is arranged in the space 3 such that the direction of the magnet in a south-end-north-end direction is perpendicular, i.e. with an angel v=90°, which is defined in FIG. 1, towards the bonding surface 4, i.e. the bonding surface's 4 plane, and, in relation to the attachment, towards the separate surface 5. The release device 7 has an extending section 8 which is directed substantially perpendicular against the south-end-north-end direction. Two support magnets 10, 11 are arranged in the clothing rack device 1. Those can in one embodiment consist of two permanent magnets, each comprising a north-end 10a, 11a respectively a south-end 11a, 11b which are smaller than the magnet 2, i.e. generates a magnetic field with lower flux density and less magnetic force than the magnet 2. In one embodiment the south-end-north-end-direction of the support magnets 10, 11 is directed substantially towards the magnet's 2 center or rotation point. The two support magnets 10, 11 allow that the magnet 2 is bias towards its first state through the attracting force between the support magnets north-ends and the magnet's 2 south-end 2b. In one embodiment the reverse could of course be the case, i.e. that the support magnets south-ends 10b, 11 b are directed towards the magnet's 2 centre or rotation point under the condition that the magnet 2 is arranged in the space 3 in a first state such that the south-end 2b is closer the bonding surface 4 than the north-end 2a.

FIG. 2b shows a clothing rack device 1 in which the magnet 2 has been brought to rotate to the second state, through bringing the release device 7 to a second state, in which the release of the clothing rack device 1 from the separate surface 5 is facilitated. FIG. 2b also shows how the clothing rack device 1 has been moved a distance from the clothing rod 6 after the being released in relation to the position in FIG. 2a. The magnetic force in a direction towards the bonding surface 4 and also the separate surface's 5 plane in correlation with the releasing of the clothing rack device 1 decrease in the second state in relation to the first state. The magnetic force between the magnet 2 and when the bonding surface 4 comprises a magnetic material also between this and the separate surface 5 decreases in the second state. In one embodiment at least this is fulfilled under the condition that the separate surface 5 abuts the bonding surface 4. In one embodiment the magnet 2 has be brought to rotate 90° so that the air gap now is located in front of the internal wall 3c at the space 3 closest to the bonding surface 4, in which the south-end-north-end-direction is parallel to the bonding surface 4. In one embodiment does a rotation of the magnet 2 occur such that v≠90. Both the direction of the magnet 2 in the second state, i.e. in which state the closest distance to one of the north-ends 2a alternatively the south-end 2b is at a lower distance from the bonding surface 4 than in the first state, and that the instead formed air gap 3a, 3b between the magnet and the bonding surface 4 contributes to the decreased magnetic force in a direction towards the bonding surface 4. The magnetic flux density or the field of magnetization or magnetic flow through the bonding surface 4 decreases of the same reason through the bonding surface 4, in the second state in relation to the first state. In addition to that the magnetic flux density of the magnetic field decreases with an increased distance from the magnet 2, the flux density is further decreased through the bonding surface 4 and the material of the clothing rack device 1 has a higher magnetic permeability than air. The north-end 10a of the support magnet 10 attracts the south-end of the magnet 2, as well as the north-end 11a of the support magnet 11 repels the north-end 2a of the magnet 2 why a force is applied to the magnet 2 to rotate back to the first state through that the support magnets 10, 11 are fixed to their states in the clothing rack device 1. Through this the magnet 2 is biased towards the first state. In one embodiment can instead of support magnets 10, 11, alternatively parallel to the support magnets 10, 11, a spring be arranged in connection to the magnet 2, for example to its centre point 2c or to the release device 7 to create a bias of the magnet 2 to automatically return to the first state when the release device 7 no longer is brought in any direction or in any other way is affected by any other force.

The above given description of embodiments shall not be seen as limiting and can be combined freely within the scope of the patent claims. All the above mentioned embodiments or parts of an embodiment can also be combined freely as long as the combination is not contradictory.

The invention claimed is:

1. A clothing rack device for suspension of clothes, wherein a magnet is arranged in a section of the clothing rack device adapted to attach the clothing rack device with a bonding surface to a separate surface, the clothing rack device further comprising a release device adapted to be moved between a first and second state, wherein the magnetic force between the magnet and a separate surface abutting the bonding surface is greater in the first state than in the second.

2. A clothing rack device for suspension of clothes, wherein a magnet is arranged in a section of the clothing rack device adapted to attach the clothing rack device with a bonding surface to a separate surface, the clothing rack device further comprising a release device adapted to be moved between a first and second state, wherein the magnetic flux density through the bonding surface is greater in the first state than in the second.

3. The clothing rack device according to claim 1, wherein the magnet is pivotally arranged in a space in the clothing rack device wherein the magnet is adapted to be pivoted between a first and second state, wherein the magnet in the first state is arranged in a south-north end direction which is perpendicular to the bonding surface, wherein the magnet in the second state is arranged in a south-north end direction which has an angle v≠90° towards the bonding surface.

4. The clothing rack device according to claim 3, wherein the magnet is adjacent to an internal wall of the space in a direction towards the bonding surface in the first state, wherein an air gap exists between the magnet and the internal wall of the space in the direction towards the bonding surface in the second state.

5. The clothing rack device according to claim 1, wherein the bonding surface comprises a magnetic material.

6. The clothing rack device according to claim 3, wherein the magnet is adapted to be biased towards the first state.

7. The clothing rack device according to claim 6, wherein two support magnets are arranged in the clothing rack device, which each have their respective south-north end direction directed substantially towards a center or a rotation point of the magnet.

8. The clothing rack device according to claim 6, wherein the magnet is adapted to be biased towards the first state by means of a spring.

9. The clothing rack device according to claim 1, wherein the release device comprises an activation arm arranged in the magnet, in which the activation arm extends from the surface of the clothing rack device.

10. The clothing rack device according to claim 1, wherein the magnet is a neodymium magnet.

11. The clothing rack device according to claim 3, wherein the south-north end direction of the magnet in the second state is parallel to the bonding surface.

12. The clothing rack device according to claim 2, wherein the magnet is pivotally arranged in a space in the clothing rack device wherein the magnet is adapted to be pivoted between a first and second state, wherein the magnet in the first state is arranged in a south-north end direction which is perpendicular to the bonding surface, wherein the magnet in the second state is arranged in a south-north end direction which has an angle v≠90° towards the bonding surface.

13. The clothing rack device according to claim 12, wherein the south-north end direction of the magnet in the second state is parallel to the bonding surface.

14. The clothing rack device according to claim 12, wherein the magnet is adjacent to an internal wall of the space in a direction towards the bonding surface in the first state, wherein an air gap exists between the magnet and the internal wall of the space in the direction towards the bonding surface in the second state.

15. The clothing rack device according to claim 2, wherein the bonding surface comprises a magnetic material.

16. The clothing rack device according to claim 12, wherein the magnet is adapted to be biased towards the first state.

17. The clothing rack device according to claim 16, wherein two support magnets are arranged in the clothing rack device, which each have their respective south-north end direction directed substantially towards a center or a rotation point of the magnet.

18. The clothing rack device according to claim 16, wherein the magnet is adapted to be biased towards the first state by means of a spring.

19. The clothing rack device according to claim 2, wherein the release device comprises an activation arm arranged in the magnet, wherein the activation arm extends from the surface of the clothing rack device.

20. The clothing rack device according to claim 2, wherein the magnet is a neodymium magnet.

* * * * *